UNITED STATES PATENT OFFICE.

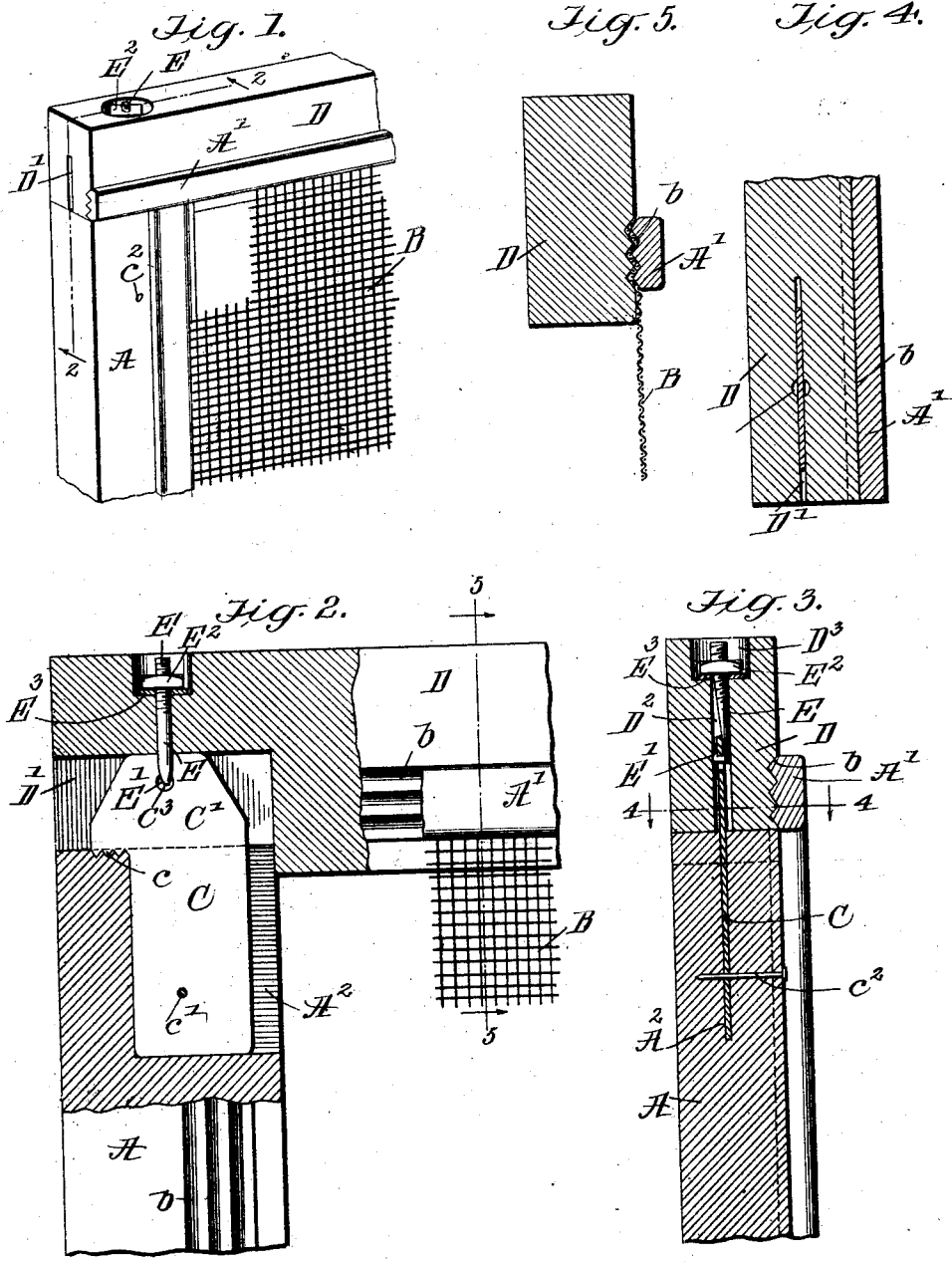

FREDERICK W. VAN FLEET, OF MOUNT BLANCHARD, OHIO.

JOINT FOR SCREENS AND OTHER FRAMES.

No. 905,772.   Specification of Letters Patent.   Patented Dec. 1, 1908.

Application filed March 31, 1908. Serial No. 424,412.

*To all whom it may concern:*

Be it known that I, FREDERICK W. VAN FLEET, a citizen of the United States, and a resident of Mount Blanchard, in the county of Hancock and State of Ohio, have invented certain new and useful Improvements in Joints for Screens and Other Frames, of which the following is a specification.

My invention relates to improvements in joints for screen and other frames and has for its object to provide a joint which shall be simple, cheap and efficient and one which renders a frame rigid and permits of making frames of various sizes.

My invention consists in certain novel features of construction, arrangement and combination of parts as will be hereinafter fully described and pointed out in the claims, reference being had to the accompanying drawings, in which—

Figure 1 is a perspective view of one corner of a screen frame showing my improvements applied. Fig. 2 is a sectional elevation of same corner. Fig. 3 is a vertical section of same. Fig. 4 is a horizontal section taken on line 4—4 of Fig. 3. Fig. 5 is a vertical section taken on line 5—5 of Fig. 2.

In carrying out my invention I make the horizontal rail or stile D with a small shoulder, cut back as far as the first groove so that the molding $A'$ which holds the wire screen B will fit without trimming. The rail or stile A is slitted as at $A^2$ from the inner edge and in this slit is placed the metal tenon or plate C which has a projecting head portion $C'$, the lower face of which is formed with teeth $c$; the tenon also has a small hole $c'$ through which a pin $c^2$ is driven from the inner face of the vertical rail when the tenon is properly placed.

The horizontal or stile rail D is slitted as at $D'$ to receive the head $C'$ of the tenon or anchor plate C, and a small hole $D^2$ is bored through the rail D from the slit to a recess or socket $D^3$ formed in the upper face of the rail D; a straining bolt E with a hook $E'$ at its lower end and threaded at its upper end is passed through hole $D^2$ into the slit $D'$ and the hook $E'$ turned to enter a hole $C^3$ in the head $C'$ of the tenon or anchor plate C; a nut $E^2$ and a washer $E^3$ is to be screwed on the threaded end of the bolt E, the nut and washer resting in the socket $D^3$ which is of sufficient size to permit turning of the nut by a suitable tool.

The parts of the frame are to be sold and shipped in a knock-down condition and put together in the following manner:—The rails or stiles being cut to the desired size, the tenon or anchor plate C is slipped into the slit $A^2$ and tapped lightly on the upper end to cause the teeth $c$ to bite into the rail A and hold it firmly in position. The slitted end of rail D is now brought toward the rail A the tenon C entering the slit $D'$, the bolt E having been previously passed through the hole $D^2$ and the nut screwed on its upper end; the meeting ends of the rails are now in the desired position, the hook $E'$ is turned so as to engage the hole $C^3$; a small pin $C^2$ is now driven through the front face of the rail and through the hole $c'$ in the tenon; to make the joint tight and rigid it is now only necessary to turn the nut on the bolt E in the socket $D^3$ which draws the ends of the two rails closely together. The screen netting is now secured to the frame by means of the molding strips $A'$ which are grooved as at $f$ on their rear face, said grooves corresponding to grooves $d$ in the face of the rails, the grooves serving to crimp the wire netting and hold it against slipping.

The screens are to slide on outside of and against the blind stops and flush with outer face of window casing, and the screens can be used for either upper or lower half of window; a small strip of wood of the same thickness as the blind stop, is fastened at either end of the stop and fills space between window sash and screen frame, whether screen be up or down; the strip is fastened by small pieces of tin or metal tacked to the ends after it is cut to proper length, and projecting on upper and lower sides, to be tacked to the blind stops.

By the use of my improvements, the frames are rendered adjustable to any size, both as to length and width. Such a frame has all the advantages of a mortise and tenon frame, and has an advantage over such a frame which is naturally weakened by the mortise and tenon, in that I use only slits and a metal tenon which does not rot, and by the use of the bolt and nut the frame may be tightened at any time should it become loose by shrinkage or drying out.

I claim:

1. A joint for frames comprising two angularly abutting rails or stiles having slits in their adjacent ends, a metallic anchor plate or tenon removably held in the slit of one rail and having a laterally projecting head portion having teeth on its lower edge, and a straining bolt mounted in the other rail and extending into the slit thereof and engaging the aforesaid metallic anchor plate or tenon.

2. A joint for frames, comprising two rails abutting at an angle to each other and having slits or sockets at their abutting ends, a flat metallic anchor plate held within the slit in one rail, and a straining bolt mounted in the other rail and extending into the slit thereof and engaging the said anchor plate.

3. A joint for frames comprising two angularly abutting rails or stiles, said rails or stiles having slits in their adjacent ends, a removable flat metallic anchor plate mounted in the slit of one rail or stile, and having an aperture near the end, a straining bolt bent at one end to form a hook, mounted in the other rail or stile, said hook end projecting into the slit of its rail and engaging the aperture in the metallic anchor plate or tenon, and a nut engaging the threaded end of the bolt.

4. A joint for frames comprising two angularly abutting rails or stiles, having slits at their adjacent ends, a metallic anchor plate or tenon removably held in the slit of one rail and having a laterally projecting head portion provided with teeth on its lower edge, and having an aperture therethrough, a straining bolt mounted in the other rail and bent at one end to form a hook, said hook end projecting into the slit of its rail and engaging the aperture in the head of the metallic anchor plate or tenon, a nut engaging the threaded end of said straining bolt, said nut adapted to be seated in a socket in the edge of the rail carrying said bolt.

5. A joint for frames comprising two angularly abutting rails or stiles having slits in their adjacent ends, a metallic anchor plate or tenon removably held in the slit of one rail and having a laterally projecting head portion, and a straining bolt mounted in the other rail and extending into the slit thereof and engaging the aforesaid anchor plate or tenon.

FREDERICK W. VAN FLEET.

Witnesses:
MAY HAMLIN,
MARY J. HAMLIN.